Feb. 22, 1949.  F. E. SETTE  2,462,291
VALVE
Filed May 3, 1944  2 Sheets-Sheet 1
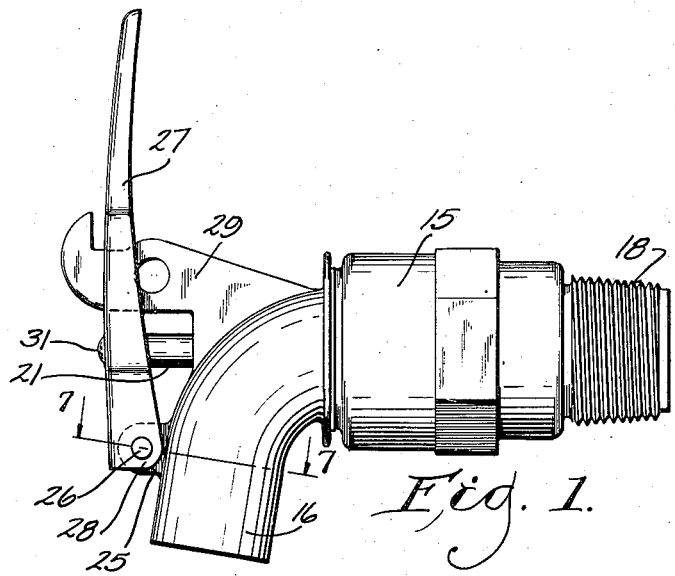
Fig. 1.
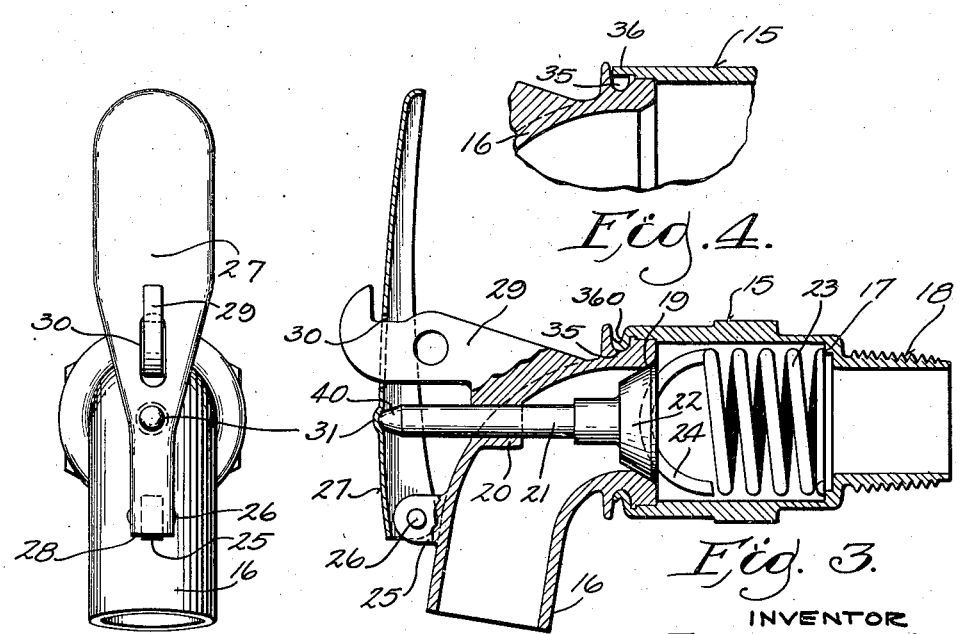
Fig. 4.
Fig. 2.
Fig. 3.
INVENTOR
FREDERICK E. SETTE
BY
Wheeler, Wheeler & Wheeler
ATTORNEYS.

Feb. 22, 1949.  F. E. SETTE  2,462,291
VALVE
Filed May 3, 1944  2 Sheets-Sheet 2
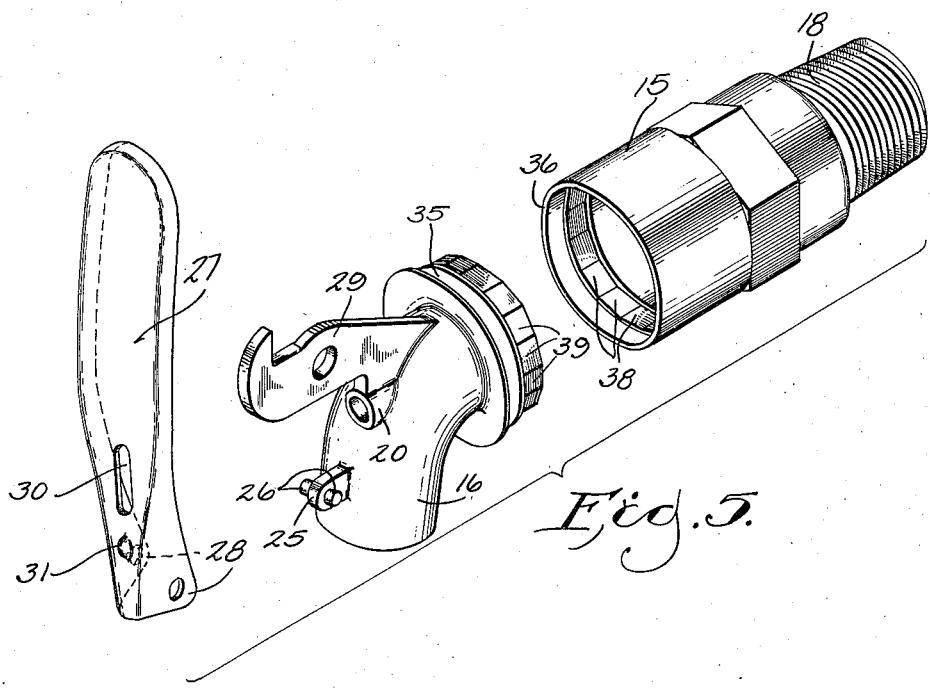
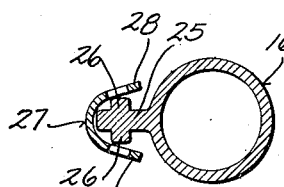
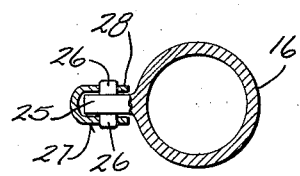
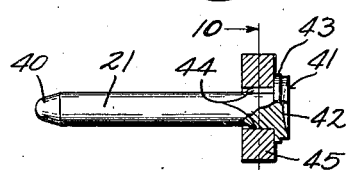
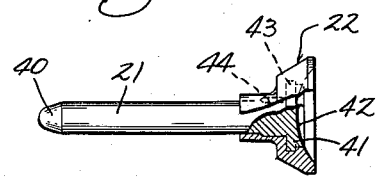
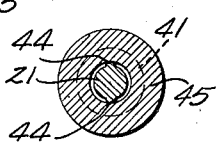
INVENTOR
FREDERICK E. SETTE
BY Wheeler, Wheeler & Wheeler
ATTORNEYS.

Patented Feb. 22, 1949

2,462,291

UNITED STATES PATENT OFFICE 2,462,291

VALVE

Frederick E. Sette, Alameda, Calif.

Application May 3, 1944, Serial No. 533,850

1 Claim. (Cl. 251—25)

This invention relates to improvements in valves.

It is the primary object of the invention to simplify and render less expensive the construction of a valve. More specifically, it is proposed to manufacture a valve of the general type shown in United States Patent No. 1,551,853, but to provide a means whereby the component parts of the valve casing and stem may be die cast and assembled to each other and to the remaining parts of the valve in a novel and improved manner at greatly reduced cost.

Other specific objects of the invention are the provision of a valve casing structure in which the component parts are keyed against relative rotation to facilitate the assembly hereinafter described; to provide a novel and improved means eliminating parts heretofore used for fulcruming the operating handle; to provide a novel and simple and improved assembly of the valve plug or body with a stem and other improvements which will appear more particularly to those skilled in the art upon examination of the following disclosure.

In the drawings:

Fig. 1 is a side elevation of a complete valve embodying the invention.

Fig. 2 is a front elevation of the valve shown in Fig. 1.

Fig. 3 is a view of the valve in longitudinal section.

Fig. 4 is a fragmentary detail of the component parts of the valve casing associated preliminary to their assembly.

Fig. 5 is a view in perspective of the separated component parts of the valve casing and handle.

Fig. 6 is a detail view taken in cross section in the plane indicated at 7—7 in Fig. 1, but showing the parts prior to assembly.

Fig. 7 is a cross sectional view taken on line 7—7 of Fig. 1.

Fig. 8 is a detail view partially in elevation and partially in axial section showing the component parts of the valve plug and stem associated prior to assembly.

Fig. 9 is a view similar to Fig. 8 showing the assembled valve plug and stem partially in side elevation and partially in section.

Fig. 10 is a detail view taken in cross section on the line 10—10 of Fig. 8.

Like parts are identified by the same reference characters throughout the several views.

The valve casing comprises a barrel portion 15 and a spout portion 16 separately made and preferably die cast of zinc alloy. The barrel portion 15 is internally shouldered at 17 to provide a spring seat and has an externally threaded spud 18 through which is admitted the liquid to be controlled by the valve.

The spout portion 16 has a valve seat at 19 and an axially aligned bearing at 20 for the stem 21 connected to the valve plug 22 which is normally held to the seat by the compression spring 23. A curved arm 24 integrally formed on the end of the spring seats in a concavity of the plug to maintain the spring and plug centered with respect to each other.

Externally on the spout, I provide a boss 25 having oppositely projecting lugs 26 as best shown in Fig. 6 and Fig. 7. The handle 27 is formed with a channel shape, the channel sides terminating in apertured ear portions 28 initially left somewhat divergent, as shown in Fig. 6. With the handle associated with the spout in such a manner as to register its apertured ears with the bosses 26, the ears 28 are compressed into parallelism as shown in Fig. 7 to engage the bosses 26 in the apertured ears whereby the handle is fulcrumed to the spout. The spout may be provided with a locking arm 29 projecting through a slot 30 in the handle, if desired. It is also preferred that the handle have a socket formed at 31 in which the end of the valve stem 21 is engaged.

In die casting or otherwise molding the valve casing elements 15, 16, one of them (in this case the spout portion 16) is formed with a channel 35, the other (in this case, the barrel portion 15) having a sleeve portion 36 adapted to telescopically overlie the channeled portion of the section first mentioned, as clearly shown in Fig. 4. By some method of metal deformation (preferably by spinning), the overhanging sleeve portion 36 is forced into the channel 35 as indicated at 360 in Fig. 3 and Fig. 1, thus securely locking the casing sections together upon the interposed valve spring and valve.

Because of the nature of the interlock thus effected, there would be nothing to prevent the valve from becoming loosened by torsion if it were not for the fact that I have keyed the two sections together in the course of their preliminary association. The interior of the sleeve 36 is faceted as indicated at 38 in Fig. 5, and corresponding external facets are formed at 39 on the part of spout portion 15 which projects beyond the channel 35. In associating the casing elements 16 and 17, the facets of the spout element are registered with the facets of the barrel element with the result that when the sleeve portion 36 is rolled into the channel 35, the elements are not only permanently connected against axial separation, but are left securely keyed against relative rotation. No matter how much rotative force may be exerted on the spout in screwing the completed facet into a barrel or pipe connection, the component parts will function unitarily without becoming loosened.

In accordance with the disclosure of the previous Patent No. 1,551,853 above referred to, the valve plug 22 is preferably made of some rather soft metal, such as lead. The stem 21 may be die cast. It has a tapered and rounded end 40 adapted to fit into the socket 31 of the handle. Its opposite end is headed at 41, the head having a recess 42 into which the spring portion 24 is received in the assembled valve. An annular flange 43 is preferably provided around the head and one or more ribs 44 extend longitudinally of the stem adjacent the head, as indicated in Figs. 8, 9 and 10.

On to the valve stem thus prefabricated by die casting or otherwise, an annulus 45 of the soft metal which is to comprise valve plug 22 is pressed over the ribs 44 and against the head 41. Thereupon the associated stem and blank 45 are placed in a die which, in a cold molding operation under high pressure, forms the slug or blank of soft metal 45 into intimate contact with the stem 21, the ribs 44, the flange 43 and head 41 to provide the finished valve plug as best shown in Figs. 3 and 9. In the finished product, the stem and plug have the appearance of being unitary. The molding of the plug blank about the head, flange, and ribs of the stem assures a permanent and unitary connection between the parts.

The prefabricated valve plug and stem assembly is inserted into the spout element of the casing and the prefabricated spring is inserted into the barrel element of the casing before the casing elements are associated and permanently united by the deformation of sleeve 36. The associating of the casing elements as above described must, therefore, involve some compression of the spring 23 to establish the bias with which the valve plug 22 is held to its seat.

Either before or after the operations above described, the handle which is prefabricated in the form shown in Fig. 5 and Fig. 6 has its notched portion engaged over the bail supporting and locking arm 29 and its ear portions pressed together into engagement with the pintle lugs 26.

While the particular metal of which the assembly is formed is unimportant, it is noteworthy that the procedures above outlined solve the problem of making a valve of this general type cheaply by die casting, the objective being to enable die cast parts to be assembled with the other component elements of the valve and with each other, whereby this valve may be made at a fraction of the cost heretofore involved.

I claim:

In a valve mechanism, a valve stem having an arcuately cross-channeled head, a relatively soft valve plug embracing the head of the stem, and a valve actuating spring having an arcuate end portion socketed in the cross channel of the head, said plug having a registering cross channel in which said arcuate end portion of the spring is also engaged, whereby relative rotation and shifting movements of the plug and stem head are prevented.

FREDERICK E. SETTE.

REFERENCES CITED

The following references are of record in the file of this patent:

UNITED STATES PATENTS

| Number | Name | Date |
|---|---|---|
| 744,441 | Underwood | Nov. 17, 1903 |
| 881,191 | MacLachlan | Mar. 10, 1908 |
| 1,092,464 | Watson | Apr. 7, 1914 |
| 1,234,096 | Farrell | July 17, 1917 |
| 1,329,479 | Savon | Feb. 3, 1920 |
| 1,551,853 | Sette | Sept. 1, 1925 |
| 1,674,076 | Weatherhead | June 19, 1928 |
| 1,678,640 | Hall | July 31, 1928 |
| 1,775,055 | Tarbox et al. | Sept. 2, 1930 |
| 1,778,244 | Cadden | Oct. 14, 1930 |
| 1,881,537 | Harper | Oct. 11, 1932 |
| 1,945,777 | Heidloff | Feb. 6, 1934 |
| 2,069,153 | Konkle | Jan. 26, 1937 |
| 2,218,641 | Groen | Oct. 22, 1940 |
| 2,219,471 | Davis | Oct. 29, 1940 |
| 2,287,150 | Taylor | June 23, 1942 |
| 2,348,173 | Young | May 2, 1944 |

FOREIGN PATENTS

| Number | Country | Date |
|---|---|---|
| 343,967 | Great Britain | 1929 |

OTHER REFERENCES

"Die Castings," by Chase, pub. by John Wiley & Sons, New York, 1934, pages 74–78.